United States Patent Office 2,895,829
Patented July 21, 1959

2,895,829

BEE FOOD COMPOSITION

Edmond G. Feo, Van Nuys, Edward D. Feldman, Hollywood, and Harry M. Goetz, Los Angeles, Calif., assignors to Atlas Laboratories, Inc., Hollywood, Calif., a corporation of California No Drawing. Application February 28, 1957
Serial No. 642,958

6 Claims. (Cl. 99—2)

This invention relates to a novel bee food or pollen supplement for the feeding of bees.

It is often necessary to supplement the natural pollen on which bees feed with another food composition, in order to maintain the strength of the colony and maintain brood rearing, especially during periods and in areas of pollen shortage. However, heretofore it has been difficult to formulate a satisfactory bee food which is acceptable to the bees, and at the same time functions to maintain the strength of the colony. Many compositions have been tested which, while being satisfactory from the standpoint of stimulating brood rearing and being free of deleterious effects on apiary products, were not sufficiently attractive to be acceptable to the bees, which are highly sensitive. On the other hand, certain other compositions, while taken by the bees in some measure, did not possess the proper growth and strength characteristics of natural pollen, resulting particularly in high mortality rate. Also, the need for a satisfactory bee food to strengthen or reduce the mortality rate of the bee colonies is rendered more acute by the present extensive use of insecticides, which have resulted in killing off large numbers of bees.

Thus, for example, we have tested as bee foods various blends of materials including soya meal, wheat fractions, rye fractions, vegetable concentrates, e.g., alfalfa, beans, beets, cabbage and the like, carbohydrates, proteins and amino acids, cholesterol, meat straps, eggs and their fractions, bone meal, and many other food elements. Although these food elements were blended in numerous ways in an effort to simulate natural pollen, none of the blends so formulated was found acceptable by the bees in quantity to properly maintain and produce brood and to strengthen the colony.

It is accordingly an object of the invention to provide a bee food or pollen supplement which will be acceptable to and taken by the bees in sufficient quantity to maintain colony strength.

A further object is to afford a bee food formulation of the foregoing type, which does not affect the natural disposition of the bees and acts as a stimulus to brood rearing.

A particular object is the provision of a bee food composition embodying an effective lure for the bees.

Still another object is to provide a process for the feeding of bees making use therein of the aforementioned composition.

Other objects and advantages will be apparent hereinafter.

We have found that the above objects can be accomplished by incorporating grape pomace, dehydrated grapes, or grape juice concentrate in bee food compositions. These additives can be employed separately, or mixtures of two or all of these additives can be employed. The preferred additive is grape pomace. The addition of such additives, e.g., grape pomace, to bee food compositions or pollen supplements renders these compositions markedly more acceptable and palatable to the bees than in the case of bee foods not containing such additives. At the same time, the above additives derived from grapes do not deleteriously affect but rather aid the functioning of the other ingredients of the composition for strengthening the colony and stimulating brood rearing.

For maximum effectiveness of the above additives such as grape pomace in the bee food, it is preferred that the mixture of ingredients or nutrients in which such additives are incorporated, be substantially odor-free, or if such mixture contains an odor such odor should not be malodorous or offensive. While malodorous compositions to which the grape type material is added do not adversely affect in a material way the value of the final composition as a bee food, such malodorous compositions are not preferred since they are not readily acceptable by the bees. Apparently, the grape pomace or other grape derived additive noted above furnishes an odor which is believed to act as a lure to the bees, and the presence of other extraneous odors which either tend to camouflage the odor of such additive or which is unattractive to the bees, will reduce the effectiveness of the additive. The mixture of ingredients to which the grape pomace or other grape type material is added is generally composed of ingredients which individually preferably also are substantially odor-free, or which at least have an inoffensive odor.

Preferably, we incorporate the grape pomace, dehydrated grapes or grape juice concentrate in a substantially dry mixture of food ingredients furnishing a protein, a carbohydrate and a fat. The protein is preferably a partially digested protein, the carbohydrate is preferably a sugar, and the fat may be, for example, a glyceride. Other ingredients, while not essential, may also be included. Such additional ingredients include, for example, vitamins.

The pomace employed for our purpose is the residue obtained from the pressing of grapes in making wine or grape juice. Such residue is composed of the dry pulp following expression of the juice from the grapes, including the skins, and seeds of the grapes and sometimes the stems, preferably ground to pass a 325 mesh screen. Where dehydrated grapes are employed, this material is also preferably ground to the aforementioned size particles. Where concentrated grape juice is used, such material contains generally in excess of 70% solids partly in solution and partly suspended in a liquid medium, said solids being primarily sugars of the laevo rotatory type including fructose. These grape derived materials not only function as a lure or scent to make the food blend acceptable to the bees, but also appears to act synergistically with the other components of the bee food composition to strengthen and make the bees more vigorous. It has been found that only the above grape additives, and preferably grape pomace, are suitable for our purpose. Other types of fruit extracts and pomace such as that derived from apples, prunes and citrus fruits, and from dehydrated vegetables such as carrots, have not been found suitable.

The sources of the protein component of our composition can be soya fluor, bone meal, gluten, fish meal, egg or egg yolk solids, meat scraps, casein, milk solids and yeast. These are given only by way of illustration. Although undigested proteins can be used, it is preferred that the protein such, for example, as the soya flour or yeast, be in partially digested or partially hydrolyzed form. These protein hydrolyzates can be produced either by acidic or enzymatic hydrolysis of the protein in conventional manner to form a complex mixture of polypeptides and amino acids as the partially hydrolyzed protein product. Thus, for example, the partially hydrolyzed soya flour may contain, for example, about 50% polypeptide and about 50% amino acids, with a total nitrogen content of about 42%, although these percentages are to be understood as only illustrative.

Often, a plurality of ingredients which are sources of protein or partially digested protein are employed. Thus, for example, partial hydrolyzates from soya flour and from yeast can be mixed in the same composition, and milk solids and/or egg solids can also be added to supplement the protein content of the soya flour and yeast.

As the source of carbohydrate, we employ simple sugars, preferably sucrose (cane sugar) or fructose. Sucrose and fructose are particularly characterized by their extreme sweetness. Other types of sugars such as dextrose are much less effective than sucrose or fructose. Where grape juice concentrate is employed, the fructose therein can serve as a source of carbohydrate.

Ingredients containing fats are also incorporated in the bee food composition to provide a balanced nutritional feed. Such fats include, for example, the glycerides of fatty acids. Such fats are present, for example, in buttermilk solids, meat scraps, wheat germ, vegetable oils and tissue fats, which can be incorporated in the pollen supplement.

We also preferably incorporate minor amounts of vitamins in the composition. Illustrative vitamins are, for example, riboflavin, nicotinic acid, thiamin hydrochloride, niacin, vitamin A, vitamin B complex, and $B_2$. The vitamins are furnished to some degree by the other components present in the composition, such as yeast, which furnishes B complex, and milk solids. However, when such components do not furnish sufficient vitamin content, additional traces of such vitamins are added.

It is also preferred to add a minor amount of a lipid such as cholesterol or lecithin to the bee food composition. The required cholesterol content may be furnished by egg solids or other ingredients such as tissue fats or animal extracts, while lecithin may be furnished by meat scrap, egg yolk solids, or vegetable oils. The generic term "fat" as employed herein is intended to also include lipids.

Other nutrients may also be incorporated into the composition, if desired. These include, for example, honey which may be added to supplement the sugar content, inositol which may be found in meat scrap, biotin furnished by egg yolk, mineral salts such as bone ash, herbs, etc.

It is noted that the individual components of our bee food composition and the composition itself are substantially dry. By "substantially dry" is meant that the ultimate composition containing the grape pomace, dehydrated grapes or grape juice concentrate contains not more than about 10% water or moisture. If an amount of moisture exceeding the aforementioned percentage is present, secondary fermentation and reactions which develop extraneous odors generally occur which reduce the effectiveness of the grape pomace, or other grape type additive noted above.

The proportions of the various chemical components and ingredients of our composition may be varied to produce a bee food or pollen supplement which by experience appears to be most suitable in a particular locality and for a particular bee colony. A range of proportions of the main constituents which can be employed is given in Table 1 below by way of example.

TABLE 1

| | Percent |
|---|---|
| Protein | 5–50 |
| Carbohydrate | 15–75 |
| Fats | 2–8 |
| Grape pomace, dehydrated grapes or grape juice concentrate | 15–40 |

Other ingredients in sufficient quantity.

The various ingredients are employed within the range of percentages given above in Table 1, the ingredients being used in amounts sufficient to total 100%. Thus, for example, a typical bee food, according to the invention, can consist of say 25% protein, 40% carbohydrate, 25% grape pomace, 5% fat and 5% of other constituents.

The ingredients of the composition furnishing the components of Table 1 may be mixed in any suitable manner to produce the desired formulation. In a typical bee food, grape pomace, dehydrated grapes or grape juice concentrate is incorporated in a composition in which the proteins are chiefly partial hydrolyzates of soya flour and yeast, the carbohydrate is sucrose, the fat is furnished by meat scraps, buttermilk solids, milk solids and vegetable oil, and cholesterol, honey and vitamins are added. Table 2 below sets forth these ingredients with an approximate range for each.

TABLE 2

| | Percent |
|---|---|
| Grape pomace, dehydrated grapes or grape juice concentrate | 15–40 |
| Partial hydrolyzate of soya flour | 10–25 |
| Partial hydrolyzate of yeast | 2–10 |
| Sucrose | 15–40 |
| Milk solids | 2–5 |
| Buttermilk solids | 5–10 |
| Wheat germ | 1–5 |
| Meat scraps | 1–2 |
| Egg yolk solids | 2–10 |
| Cholesterol | 2–5 |
| Lecithin | 0.5–2.5 |
| Honey | 0–35 |
| Vitamins (riboflavin, niacin and B complex minor amts. less than 0.1. | |
| Moisture | 0–10 |

The various ingredients noted above in Table 2 are utilized within the range of percentages noted in the table to give a total of 100%.

The following are examples of practice of our invention, all quantities unless otherwise stated, being expressed as parts by weight.

*Example 1*

A group of compositions were prepared by mixing together the ingredients listed below in Table 3.

TABLE 3

| Ingredients | Compositions | | | | | | | |
|---|---|---|---|---|---|---|---|---|
| | A | B | C | D | E | F | G | H |
| Partially hydrolyzed soya flour | 10.0 | | 10.0 | 20.0 | | 10.0 | 7.5 | 10.0 |
| Partially hydrolyzed yeast | 2.5 | | | 2.5 | | 2.5 | 2.5 | |
| Soya flour | | 10.0 | | | 20.0 | | | |
| Yeast | | 2.5 | | | 2.5 | | 2.5 | 5.0 |
| Sucrose | 40.0 | 50.0 | 60.0 | 70.0 | 70.0 | 50.0 | 60.0 | 42.5 |
| Milk solids | 2.0 | 2.0 | 2.0 | 2.0 | 2.0 | 2.0 | 2.0 | 2.0 |
| Egg solids (yolk) | 2.0 | 2.0 | 2.0 | 2.0 | 2.0 | 2.0 | 2.0 | 2.0 |
| Buttermilk solids | | | | | | | 2.0 | 2.0 |
| Cholesterol | 1.5 | 1.5 | 1.5 | 1.5 | 1.5 | 1.5 | 1.5 | 1.5 |
| Lecithin | 0.5 | 0.5 | 0.5 | 0.5 | 0.5 | 0.5 | 0.5 | 0.5 |
| Meat scraps | | | | | | | 0.5 | 0.5 |
| Honey | | | | | | | 2.5 | 10.0 |
| Wheat germ | | | | | | | | 2.5 |
| Bone meal | 1.5 | 1.5 | 1.5 | 1.5 | 1.5 | 1.5 | 1.5 | 1.5 |
| B complex vitamin | (1) | (1) | (1) | (1) | (1) | (1) | (1) | (1) |
| Niacin | 0.001 | 0.001 | 0.001 | 0.001 | 0.001 | 0.001 | 0.001 | 0.001 |
| Riboflavin | | | | | | | | 0.0001 |
| Grape pomace | 40.0 | 30.0 | 23.5 | | | 25.0 | 16.0 | 20.0 |
| Fructose | | | | | | 5.0 | | |

[1] Minor amounts less than 0.1%.

All of the compositions A, B, C, F, G and H of Table 3 were substantially odorless prior to addition of the grape pomace.

A number of equal 50 gram portions of composition A were weighed out, and each portion placed on a separate Petri dish. The Petri dishes bearing composition A were placed at the entrance to a beehive in the Topanga Canyon district of the Santa Monica Mountains in southern California. Another group of Petri dishes containing equal weighed amounts of composition A were placed directly on top of the frames inside the hive.

The same procedure was followed with each of compositions B through H, except that a different beehive was used for each composition.

Feeding results were observed by weighing the Petri dishes at 24 hour intervals. Also visual observation of the behavior of the bees during feeding and the nature of the brood was made.

At each of a number of successive 24 hour intervals, it was observed that in the great majority of cases, there was substantially less bee food remaining in the Petri dishes containing compositions A, B, C, F, G and H, including grape pomace, than in the Petri dishes containing compositions D and E not containing grape pomace.

It was noted that the square inches of brood (larvae) and food storage was maintained at 800 and higher in the hives supplied with compositions A, B, C, F, G, and H, indicating good maintenance of colony strength. However, in the hives tested with compositions D and E not containing grape pomace, the square inches of brood and food storage was below 800, indicating undesirable decline of colony strength.

Further, the bees in those hives furnished with compositions A, B, C, F, G and H appeared stimulated and more active than the bees in the hives supplied with compositions D and E.

*Example 2*

The grape pomace in Table 3 may be replaced with equal percentages of dehydrated grapes or grape juice concentrate, and the procedure of Example 1 followed, to obtain results similar to those noted in Example 1.

From the foregoing, it is seen that we have provided a bee food or pollen supplement by the addition of grape pomace, dehydrated grapes or grape juice concentrate to other nutrients, said bee food being markedly more acceptable to the bees than bee foods heretofore employed. The grape material additive in our bee food appears to possess multiple functions in producing these highly satisfactory results, in that such additive acts as a lure to attract the bees, and at the same time acts in some unknown manner as a synergistic material when added to substantially dry and preferably substantially odor-free or non-malodorous blends of beed food ingredients, to render the bee food more palatable and nourishing to the bees.

The term "consisting essentially of" as used in the definition of the ingredients present in the composition claimed is intended to exclude the presence of other materials in such amounts as to interfere substantially with the properties and characteristics possessed by the composition set forth but to permit the presence of other materials in such amounts as not substantially to affect said properties and characteristics adversely.

While we have described certain embodiments of our invention for the purpose of illustration, it should be understood that various modifications and adaptations thereof may be made within the spirit of the invention as set forth in the appended claims.

We claim:

1. A bee food composition which consists essentially of grape pomace and a substantially dry mixture of a partially digested protein comprising partially hydrolyzed soya flour, sucrose, and a fat.

2. A bee food composition which consists essentially of grape pomace and a substantially dry mixture of partially hydrolyzed soya flour, sucrose, cholesterol and a minor amount of a vitamin.

3. A composition as defined in claim 2, and including partially hydrolyzed yeast.

4. A bee food composition which consists essentially of grape pomace and a substantially dry mixture of partially hydrolyzed soya flour, sucrose, milk solids, egg yolk solids and a minor amount of a vitamin.

5. A composition as defined in claim 2, containing by weight about 15 to 40% grape pomace, about 10 to 25% partially hydrolyzed soya flour, about 14 to 40% sucrose, and about 2 to 5% cholesterol.

6. A composition as defined in claim 4, containing by weight about 15 to 40% grape pomace, about 10 to 25% partially hydrolyzed soya flour, about 14 to 40% sucrose, about 5 to 10% milk solids and about 2 to 10% egg yolk solids.

References Cited in the file of this patent
FOREIGN PATENTS

| 353,333 | France | 1905 |
| 420,463 | Italy | 1947 |

OTHER REFERENCES

Root: The ABC & XYZ of Bee Culture, A. I. Root Co., Medina, Ohio (1947), pp. 68–70.

Betty Crocker's Picture Cook Book, 1st ed., 1950, McGraw-Hill, New York, p. 308.

Gourmet Cookbook, 1950, Gourmet Distributing Corp., New York, pp. 507–8.